United States Patent

[11] 3,530,787

| [72] | Inventor | Frank R. Litterio<br>53 S. Maple Ave., East Orange, New Jersey 07018 |
|---|---|---|
| [21] | Appl. No. | 622,956 |
| [22] | Filed | March 14, 1967 |
| [45] | Patented | Sept. 29, 1970 |

[54] APPARATUS FOR PREPARING AND DISPENSING FRESHLY BREWED COFFEE
5 Claims, 2 Drawing Figs.

[52] U.S. Cl....................................................... 99/281,
  99/299, 99/289
[51] Int. Cl........................................................ A47j 31/40
[50] Field of Search........................................... 99/280,
  281, 282, 283, 289, 295, 296, 299, 300, 304, 307

[56] References Cited
UNITED STATES PATENTS

| 2,926,234 | 2/1960 | Palmer | 99/281X |
| 3,347,151 | 10/1967 | Ronalds | 99/281X |
| 3,356,010 | 12/1967 | Eisendrath | 99/299 |
| 3,371,592 | 3/1968 | Remy | 99/282 |
| 3,390,626 | 7/1968 | Holstein | 99/289X |

*Primary Examiner*—Robert W. Jenkins
*Attorney*—Angelo M. Pisarra

ABSTRACT: Apparatus for preparing and dispensing a freshly brewed cup of coffee: charging a predetermined quantity of ground roasted coffee into a vessel and continually spurt-charging mainly water at about 200°–212°F. onto said coffee, syphoning off into a cup the resultant brew in said vessel when the quantity of liquid in said vessel is about 20–50 percent of the volume of said cup and repeating said syphoning a number of times until the cup is approximately filled.

FIG. 1

Patented Sept. 29, 1970

3,530,787

110V LINE

INVENTOR
FRANK R. LITTERIO

BY
Angelo M. Pisarra
ATTORNEY

APPARATUS FOR PREPARING AND DISPENSING FRESHLY BREWED COFFEE

BACKGROUND OF THE INVENTION

This invention relates to novel apparatus for producing beverages, and is especially directed to novel apparatus for producing coffee beverages. In one of its more specific aspects, the invention is directed to novel apparatus for producing and dispensing fresh coffee beverage on a single cup basis from a predetermined charge of ground roasted coffee.

Prior to this invention others have proposed various methods and apparatus for producing coffee brews and dispensing same. In general the methods employed consisted of treating ground roasted coffee with hot water and collecting the brewed coffee in a reservoir from which it was later to be dispensed in a cup by cup fashion. Coffee brew dispensed therefrom very often is stale and flat and lacks the desired taste and aroma of freshly brewed coffee. This is mainly because the reservoir contains brewed coffee of sufficiently long standing as to have lost its flavor and aroma. Also the apparatus proposed for practicing said methods are complicated and expensive.

SUMMARY OF THE INVENTION

After considerable experimentation, I have devised a relatively simple and rugged apparatus which may be used to produce and dispense freshly brewed coffee on a single cup basis. According to one of the aspects of this invention, a predetermined quantity of ground roasted coffee is charged into a perforated member, then a predetermined quantity, approximately a cup, of hot water at about 200°–212°F. is charged in short spurts onto the ground coffee in said member whereupon it leaches out the water-soluble and other components therefrom to produce a coffee brew which is dispensed preferably and immediately directly therefrom into the cup of the consumer. The foregoing is effected in a very short period of time whereby a fresh brew of excellent taste and aroma is obtained ready for use by the purchaser. The spent coffee grounds are removed from said member and the foregoing cycle is repeated thereby to dispense another single freshly brewed cup of coffee into the cup of the consumer. The foregoing series of steps are repeated over and over again and in each cycle such a freshly brewed cup of coffee is obtained by the consumer each time.

DESCRIPTION OF THE PREFERRED EMBODIMENTS

Figure 1:
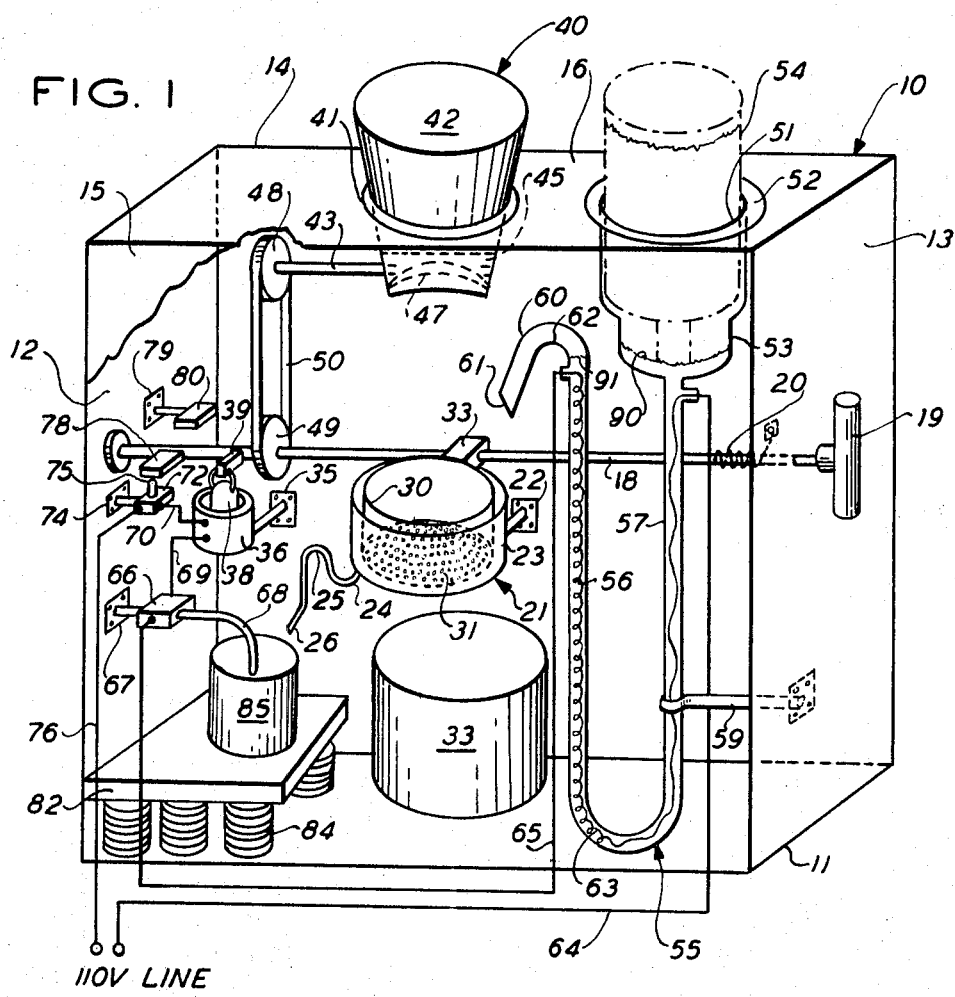
FIG. 1 is an isometric schematic view of an embodiment of the present invention.

In the illustrative embodiment of the invention shown in FIG. 1, there is a portable dispenser comprising a housing 10 consisting of a bottom plate 11, end plates 12 and 13, side plate 14 and side plate 15 (only fragment shown) and top plate 16 which are demountable conventionally connected by nuts and bolts (not shown) or other devices for ease of assembly and disassembly when desired.

Each of the end plates 12 and 13 has a bearing therein for supporting a horizontally disposed manually rotatable shaft 18 extending therebetween and then outwardly beyond plate 13 and terminating in handle 19. A coiled spring 20 extends around a portion of shaft 18, with one end thereof being secured thereto and its other end to plate 13 and continuously exerts force on shaft 18 thereby continuously tending to rotate shaft 18 clockwise.

A syphon device 21 is connected to and supported by plate 14 by a pair of brackets 22 (only one shown) secured to cup 23 of device 21 and to the plate 14. The internal diameter of cup 23 is preferably in the range of about 2 to 3 inches. Device 21 includes a siphon tube 24 which is approximately of inverted and tailed U-shape. The tube 24 is of small internal diameter, about one-fourth inch being suitable. One end thereof is secured to cup 23, is in connection therewith and extends from a port in the bottom of cup 23. The upper limit 25 of tube 24 is slightly below the level that liquid in cup 23 reaches when 20 percent–50 percent and preferable 33 percent of a cup (6—8 oz.) of hot water has been charged into cup 30 hereinafter referred to, and the free end 26 of the tube 24 is materially below the bottom of the cup 23.

The cup 30, whose outside diameter is materially less than internal diameter of cup 23 is centrally disposed in cup 23. The bottom of cup 30 is near bottom of cup 23, has a large number of very small perforations 31 and preferably measures approximately 2"–3" diameter, but is always smaller than that of cup 23. The bottom of cup 30 serves as a support and filter. A bar 33 is keyed to shaft 18 whereby it is rotatable therewith, and is secured to cup 30 whereby the cup 30 may be moved in an arcuate path to different positions upon rotation of shaft 18.

A bracket 35 is secured to plate 14 and to a solenoid coil 36 to maintain the coil 36 in fixed position at all times. The coil 36 has a central opening therethrough accommodating a soft iron armature 38 whose diameter is considerably less than that of said coil. The upper end of armature 38 is limited pivotally connected to one end of a bar 39 keyed to shaft 18 and rotatable therewith to move the armature 38 into and out of the opening in coil 36.

The top 10 has a pair of spaced openings therethrough. Extending through one of said openings is a hopper and measuring device 40 which has a flange 41 secured thereto and resting upon and demountably connected to top 16 by stud bolts (not shown). The device 40 comprises a hopper 42 open at both ends. A shaft 43 extends through the lower end of the hopper 42 and has keyed thereto a cylinder 45 having a recess or depression 47 therein which serves as a measuring or metering means for a charge of fine ground roasted coffee, loaded into the hopper 42. A sheave 48 is keyed to shaft 43 and a sheave 49 disposed therebelow is keyed to shaft 18 and a belt 50 extends around sheaves 48 and 49 whereby shafts 18 and 43 are operatively connected.

A well 51 having a flange 52 at its upper extremity is supported by top 16 through said flange 52 demountably secured thereto by stud bolts (not shown). The well 51, as illustrated in the embodiment, is in the form of an enlarged cup, necked at its lower end 53 and has a central opening or port in its bottom. In this illustrative embodiment the well 51 is of such dimensions as to accommodate and support in the manner shown, a conventional ¼—5 gallon glass bottle 54 customarily used as water container and in this instance filled with water. The free terminal of the spout end of the bottle 54 is disposed a short distance from the bottom of the well. An elongated approximately U-shaped tube 55, preferably glass, including legs 56 and 57, is supported by one or more brackets 59 (only one shown) to maintain same in position. One end of the tube 55 is secured to the bottom of well 51 at the port therein and the other end thereof is in the form of an arc 60 terminating in a downwardly extending discharge tail 61 at an angle to the vertical for discharging water spurts into the cup 30. The vertical upper limit of the lower internal face 62 of the arc 60 is above but preferably no more than approximately 2 inches and no less than approximately 1 inch above level 90 to avoid syphoning action or only steaming during operation, whereby only spurting action occurs and such spurts are essentially or mainly water which is in its liquid condition. The internal diameter of leg 56 is preferably less than that of leg 57 and approximately one-half inch is suitable, and an electrical resistance heating element 63 is disposed in said legs, with that part in leg 56 being preferably coiled or coil-coiled and extending practically the full length thereof for providing a great deal of heat therein in a short period of time. One end of the heating element 63 which extends through the upper end of leg 56 and makes a hermetic seal thereat therewith is connected by conductor 64 to one side a conventional 110—125 v. electric power source of supply and its other end which extends through the upper end of leg 57 and makes a hermetic seal thereat therewith, is electrically connected by conductor 65 to one side of a micro-switch 66 supported and maintained in position by bracket 67 secured thereto and end plate 12. The switch 66 includes a thermosensor 68. When sensor 68 is "cold" the switch is closed, but when its temperature is elevated to about 80°C., the switch 66 automatically opens. A conductor 69 electrically connects the other side of switch 110—125 one end of coil 36. A conductor 70 electrically connects the other end of coil 36 to one side a switch 72 supported by side plate 15 through a bracket 74 secured to said plate and switch. A conductor 76 electrically connects the other side of switch 72 to the other side of said source of electric supply. The switch 72 includes a spring (not shown) actuable element 75 which normally maintains same inoperative or "open" and may be rendered operative to electrically "make" between the sides or contacts thereof when button 75 is maintained in depressed position against the action of the spring. A switch of the type as well as the micro-switch are well known to the art and therefor no detailed description of either is required.

Keyed to shaft 18 and rotatable therewith is element 78 which serves as a switch actuator and also as a stop. Secured to plate 15 by bracket 79 is a stop or shaft rotation limiter 80 against which stop 78 strikes whereby the arcuate movement in one direction of shaft 18 and elements rotatable therwith is limited. The switch 72 also serves to limit the arcuate movement in the other direction of the shaft 18.

A readily removable catch bucket 33 is supported on the bottom 11. The side plate 15 has an enlarged opening therein covered by a swingable door (not shown) for removing bucket 33 for emptying when required. The plate 15 has also another opening (not shown) in the left hand corner thereof for removing the cup of brew after produced and for inserting a fresh cup in position. As shown there is a platform 82 on bottom 11. The platform 82 consists of a plate maintained in its uppermost position by a plurality of springs 84 and is capable of being moved against the action of those springs to a lower position. A coffee brew receiving cup 85 rests on the platform in the position shown, with the upper end thereof below the discharge terminal 26 of the syphon tube and below the element 68 of the micro-switch.

Another embodiment of this invention is the same as that shown in FIG. 1 except that the bracket 22, syphon device 21 and element 30 are not employed. In their stead there is substituted a device 100 shown in FIG. 2. The device 100 consists of a cup 101 which like cup 23 is approximately 2"—3" internal diameter and serves as an extraction chamber. The cup 101 is disposed between a pair of sections of the shaft 18, is secured thereto and consequently rotatable therewith. The bottom of the cup 101 has a small port therein at which is secured a syphon tube 124 corresponding to tube 24 in all respects so that cup 101 and tube 124 serve as a syphon device similar to device 21. The center of the bottom of the cup 101 has a large opening therethrough. Secured at said large opening and depending from the bottom of cup 101 is a hollow semispherical element 103 having a central opening therein in communication with a hollow short cylinder 104. The interior face of element 103 is a ground surface. A heavy metal rod 105 extends through cylinder 104. A semispherical heavy metal element 106 is secured to rod 105 at the upper end thereof and a flange element 107 is secured to the lower end of rod 105. A rugged metallic filter disc 110 having small perforations 131 therein is securely attached to the element 106 and is spaced a short distance therefrom and from the bottom of cup 101 by element 111. The diameter of disc 110 is only slightly less than the internal diameter of cup 101 so that very few coffee grounds, if any, will pass therebetween but upon inversion of the device 100, the disc 110 is freely slideable in cup 101 and its sliding action is not to any appreciable degree impaired by the inner wall of the cup 101. The outer surface of the element 106 is a ground surface so that when in the position shown in FIG. 2, there is a liquid-tight seal formed between that surface and the ground surface of element 103 to prevent the flow of liquid therebetween.

In the embodiment shown in FIG. 1 a 1 quart to 5 gallon or more glass bottle 54 of water was inverted and inserted into the well 51 and assumed the position shown. The water flows from the discharge mouth of the bottle into the well and the U-tube 55 and automatically finds its own level, level 90 in the well and corresponding level 91 in leg 56 which are automatically maintained at this stage. Also at this stage there is no current flowing from the 110 v. source of supply and due to the action of spring 20, the shaft 18 is maintained in its maximum clockwise position (not shown), with the cup 30 being disposed above the container 33, element 78 bearing against stop 80 and armature 38 disposed outside of solenoid 36. Said elements 30, 78 and 38 are disposed 180° from their positions as shown in FIG. 1. At this stage the cavity 47 is 180° from that shown in FIG. 1. Also at this stage the hopper 42 is filled with finely ground roasted coffee, and the empty brew-receiving cup 85 is in the position shown.

The cycle of operation of the aforesaid is as follows: The handle 19 is manually rotated 180° counterclockwise against the action of spring 20 whereby the shaft 18 and elements secured thereto are correspondingly rotated to dispose them in their positions as shown in FIG. 1, and also the metering element has been rotated and so synchronized that the charge in the recess 47 discharges therefrom into cup 30 and preferably measures approximately that used for making a cup of coffee, using a "Silex" type coffee maker. This charge, distributed on its perforated base, measures about ¼" to about ¾" in depth. As the element 78 reaches its position, it acutates the push button 75 to close the switch 72 whereupon the circuit is made from one side of the 110v. source of supply through conductor 76, switch 72, conductor 70, solenoid 36, conductor 69, micro-switch 66, conductor 65, resistance 63 and conductor 65 to the other side of said source of supply. The handle 19 is released and due to the solenoid being in that circuit and consequently energized, the armature 38 is maintained therein thereby maintaining elements 78 and 30 electrically locked in the positions shown in FIG. 1. Also this stage, the temperature of the resistance element 63 has been greatly increased. That part thereof in leg 57 supplies only a small amount of heat to the water therein thereby serving merely as a preheater; and that part thereof in leg 56 generates or supplies a comparatively great amount of heat therein instantaneously and continuously whereby the water in leg 56 is quickly brought to boiling thereby forming bubbles of steam which force the boiling water in short mainly liquid spurts through arc 62 and onto the ground coffee in cup 30. As this action continues, the level 90 automatically lowers whereupon air bubbles pass into bottle 54 and water discharges from the bottle into the well to reestablish level 90. Said spurting together with automatic adjustments of liquid level 90 is continuous so long as said circuit is maintained and there is water in bottle 54.

The water at approximately 212°F. discharged in short mainly liquid spurts onto the coffee in cup 30 leaches or brews the fresh coffee grounds and the resultant brew is strained through perforated bottom 30. When the level of brew liquid in cup 23 is approximately 20 percent to 50 percent and preferably approximately 33 percent of a 6—8 oz. cup, the hot water therein has had sufficient residence time and its level is slightly above the internal level 25. This results in automatic syphoning action whereupon the liquid brew in cup 23 quickly and automatically discharges into the receiving cup 85. The foregoing is automatically repeated 2—5 and preferably 3 times depending upon the internal level 25 and the position of the sensor. When the brew in the cup 85 reaches the desired level after such aliquot portions of brew have charged therein, and this occurs over a period no greater than approximately 2 minutes and generally within about 1 — 1½ minutes from the time of handle release, the thermosensor is automatically activated, its temperature increased to at least 80°C. when the brew in cup 85 reaches the sensor. At this instant the sensor causes the micro-switch 66 to break said circuit whereupon solenoid 36 and resistance 63 are no longer energized. As a consequence thereof, no further spurting occurs and the spring 20 automatically rotates shaft 18 and elements carried thereby to their positions as first described. As a consequence thereof, the spent coffee grounds in the form of a filter cake automatically dump or discharge out of cup 30 into bucket 33. The platform 82 is depressed, the cup of freshly brewed coffee of excellent and full flavor and aroma is removed and ready for use, and a new cup replaces same. The foregoing cycle of operation is repeatable over and over again.

Figure 2:
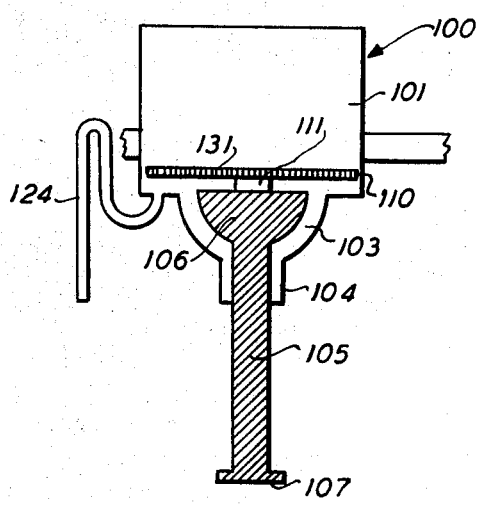
FIG. 2 is a fragmentary view of a modification of a part of the embodiment shown in FIG. 1.

The cycle of operation is the same when the device shown in FIG. 2 is substituted for cup 30—syphon device 21 assembly of FIG. 1. In this embodiment upon siad breaking of circuit by switch 66, the same actions as before described occur, except that the device 100 is rotated 180° whereupon due to the combined weights of the heavy elements 105 and 106, flange 107, element 111 and filter 131 assembly, this entire assembly together with the filter cake on filter 131 moves rapidly downward. This movement is stopped suddenly by flange 107 striking tube 104, which aids in clean separation of the cake therefrom and into the catch bucket.

While this invention has been described in detail in connection with the drawings, it is not to be limited thereby because various changes and modifications may be made within the spirit of the invention.

I claim:

1. Apparatus for brewing a cup of freshly-brewed coffee from ground roasted coffee and dispensing same comprising:
   a well having an outlet and adapted to receive the discharge end of a container of water;
   an approximately U-shaped tube, one leg of which is secured to said well, depends therefrom and is in communication therewith through said outlet;
   an arcuate discharge element secured to the upper end of the other leg of said tube, the vertical level of the internal lower face of said element located a short distance vertically above the level of the water in said well when said container of water is in operative position in said well;
   a filter for receiving a charge of ground roasted coffee thereon, a device including a syphon tube, said element disposed in said device;
   electrical resistance means disposed in and extending along said other of said legs, the electrical resistance of said means being sufficient that when said means is electrically energized sufficient heat is generated thereby to cause the water in said other leg to rapidly come to boiling and to discharge in mainly liquid spurts through said discharge element onto the ground coffee;
   said syphon tube adapted to quickly and automatically syphon off and deliver to a cup the brew from said device when the quantity thereof therein is about 20—50 percent of a full cup;
   means for supplying electrical energy to said resistance;
   means for breaking the circuit between said electrical supply and said resistance after a sufficient number of syphoned brews from said device and delivered to said cup meansures approximately a cup; and actuable means for thereafter discharging the spent grounds from said filter.

2. Apparatus according to claim 1, said last mentioned means including a rotatable shaft, said filter being connected to and rotatable with said shaft to coffee grounds receiving position and then to a position about 180° from said mentioned position for discharge of spent ground therefrom.

3. Apparatus according to claim 1, said last mentioned means including a rotatable shaft, said filter and said device being connected to and simultaneously rotatable with said shaft to coffee grounds receiving position and then to position about 180° from said first mentioned position for discharging of spent grounds from said filter, said device including means slideably supported for aiding in said discharge by dropping and sudden stopping of the filter and spent cake thereon in the course of said rotation to said second mentioned position.

4. Apparatus for brewing a cup of freshly brewed coffee from ground roasted coffee and dispensing same comprising:
   a well having an outlet and adapted to receive the discharge end of a container of water;
   an approximately U-shaped tube, one leg of which is secured to said well, depends therefrom and is in communication therewith through said outlet;
   an arcuate discharge element secured to the upper end of the other leg of said tube, the vertical level of the internal lower face of said element located a short distance vertically above the level of the water in said well when said container of water is in operative position in said well;
   a rotatable horizontally disposed shaft;
   a first cup having a perforated bottom, being secured to said shaft and rotatable therewith;
   means for holding a supply of ground roasted coffee means associated with said holding means and adapted to meter said coffee;
   a second cup accommodating said first cup and adapted to receive a metered charge of coffee;
   electrical resistance means disposed in and extending along said other of said legs, the electrical resistance of said means being sufficient that when it is electrically energized sufficient heat is generated thereby to cause the water in said other leg to rapidly come to boiling and to discharge in mainly liquid spurts through said discharge element onto the ground coffee;
   a syphon tube connected to said second cup and adapted quickly and automatically to syphon off and deliver to a receiving cup the brew from said second cup when the quantity liquid in said first and second cup is about 20— 50 percent of the volume of a conventional coffee cup;
   a source of electric energy;
   means for connecting said source to said resistance to make a circuit;
   means for breaking said circuit after a predetermined number of said syphoned brews have been produced; and
   means for rotating said shaft approximately 180° to rotate said first cup correspondingly whereby the spent coffee grounds separate from said first cup.

5. An apparatus according to claim 4, means for rotating said shaft to its original position of rotation thereby to dispose said first cup in said second cup, and to remake said circuit and to actuate said metering means whereby a predetermined quantity of said coffee is charged into said first cup, said circuit including electrical holding means as part thereof.